United States Patent
Takano et al.

(10) Patent No.: US 12,253,812 B2
(45) Date of Patent: Mar. 18, 2025

(54) POWDER REPLENISHER AND POWDER REPLENISHING METHOD

(71) Applicants: Yuki Takano, Shizuoka (JP); Masaru Narushima, Shizuoka (JP); Yasuaki Tomioka, Shizuoka (JP); Chika Hirabayashi, Kanagawa (JP)

(72) Inventors: Yuki Takano, Shizuoka (JP); Masaru Narushima, Shizuoka (JP); Yasuaki Tomioka, Shizuoka (JP); Chika Hirabayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/379,191

(22) Filed: Oct. 12, 2023

(65) Prior Publication Data

US 2024/0126190 A1  Apr. 18, 2024

(30) Foreign Application Priority Data

Oct. 14, 2022  (JP) .................................. 2022-165424

(51) Int. Cl.
*G03G 15/08* (2006.01)
*B65B 1/00* (2006.01)
(Continued)

(52) U.S. Cl.
CPC .......... *G03G 15/0879* (2013.01); *B65B 1/16* (2013.01); *B65B 1/32* (2013.01); *B65B 1/46* (2013.01); *G03G 15/0894* (2013.01)

(58) Field of Classification Search
CPC .. G03G 15/0877; G03G 15/0879; B65B 1/16; B65B 1/32; B65B 1/46; B65B 37/14; B65B 37/18
(Continued)

(56) References Cited

U.S. PATENT DOCUMENTS

2007/0223945 A1* 9/2007 Chiba ................ G03G 15/0879
                                                     399/258
2007/0242983 A1* 10/2007 Sano .................. G03G 15/0865
                                                     399/258
(Continued)

FOREIGN PATENT DOCUMENTS

JP          2004-299787 A      10/2004
JP          2011-022338 A       2/2011
(Continued)

OTHER PUBLICATIONS

Extended European Search Report issued Feb. 14, 2024 in European Patent Application No. 23202624.5, 5 pages.

*Primary Examiner* — Robert B Beatty
(74) *Attorney, Agent, or Firm* — XSENSUS LLP

(57) ABSTRACT

A powder replenisher includes a powder replenishment container to be replenished with powder. A pressure adjuster increases and decreases operating pressure applied to a variable capacity portion. A powder measuring instrument measures an amount of the powder that replenishes the powder replenishment container. A controller performs a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount. The controller controls the pressure adjuster to replenish the powder replenishment container with the powder while the controller controls the pressure adjuster based on the operating pressure detected by an operating pressure detector in the precise replenishing mode.

10 Claims, 8 Drawing Sheets

(51) Int. Cl.
  *B65B 1/16* (2006.01)
  *B65B 1/32* (2006.01)
  *B65B 1/46* (2006.01)
(58) Field of Classification Search
  USPC .................................................. 399/258, 260
  See application file for complete search history.

(56) References Cited

U.S. PATENT DOCUMENTS

2012/0063814 A1* 3/2012 Otome ............... G03G 15/0877
                                                          399/258
2012/0285540 A1* 11/2012 Morii ........................ B65B 1/38
                                                          137/1
2013/0308985 A1* 11/2013 Kim ................... G03G 15/0855
                                                          399/258

FOREIGN PATENT DOCUMENTS

| | | | |
|---|---|---|---|
| JP | 4860777 B1 | | 1/2012 |
| JP | 2012-233772 A | | 11/2012 |
| KR | 10-1198959 B1 | * | 11/2012 |
| KR | 2016-0096437 A | * | 8/2016 |
| WO | WO-2006075798 A1 | * | 7/2006 ............... B65B 1/16 |

* cited by examiner

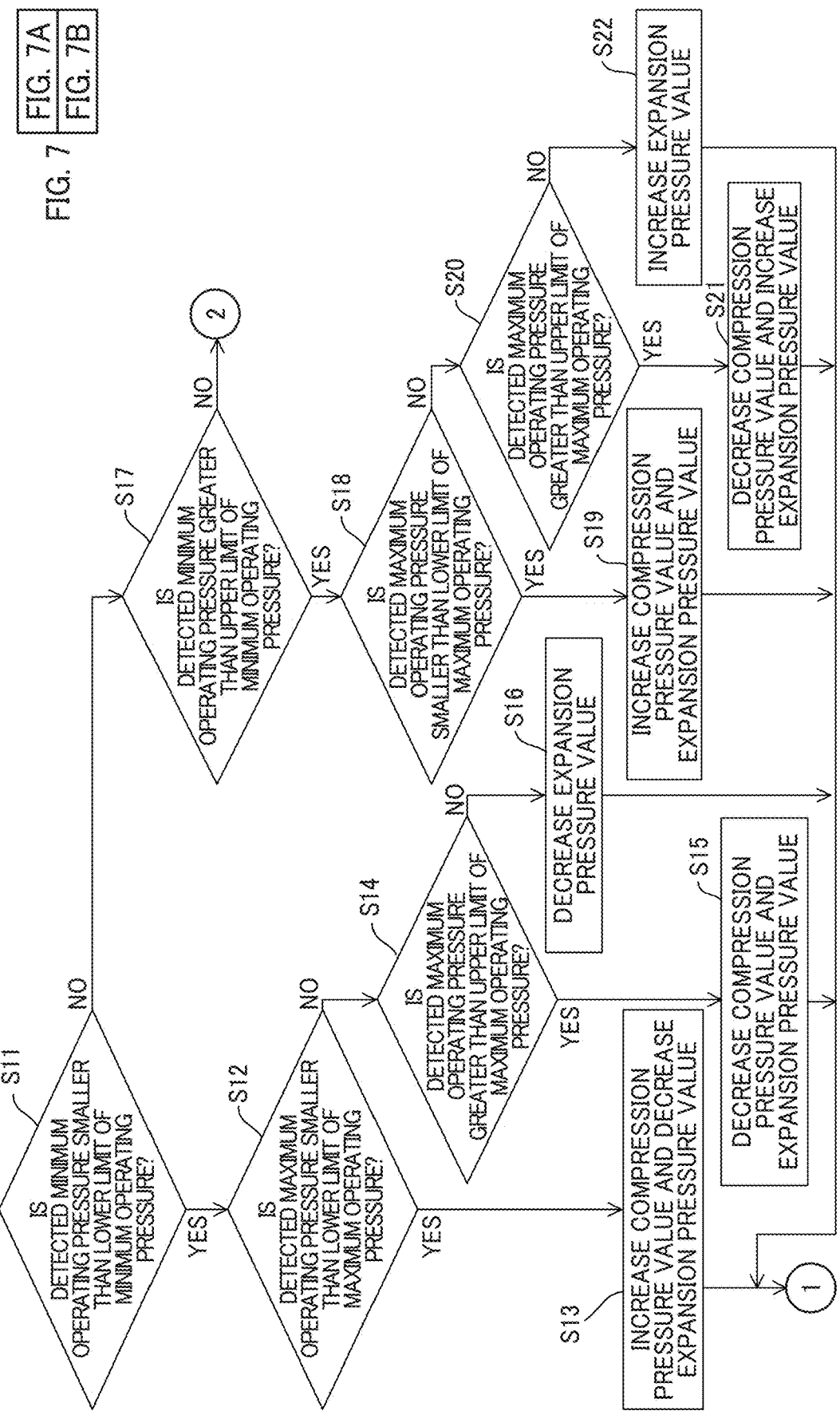

POWDER REPLENISHER AND POWDER REPLENISHING METHOD

CROSS-REFERENCE TO RELATED APPLICATION

This patent application is based on and claims priority pursuant to 35 U.S.C. § 119(a) to Japanese Patent Application No. 2022-165424, filed on Oct. 14, 2022, in the Japan Patent Office, the entire disclosure of which is hereby incorporated by reference herein.

BACKGROUND

Technical Field

Embodiments of this disclosure relate to a powder replenisher and a powder replenishing method.

RELATED ART

Related-art powder replenishers include a powder storage and a powder replenishment container. The powder storage stores powder. The powder replenishment container is replenished with the powder sent from the powder storage.

SUMMARY

This specification describes below an improved powder replenisher. In one embodiment, the powder replenisher includes a powder storage that stores powder. A powder replenishment container is replenished with the powder. A variable capacity portion has a capacity that is variable. A pressure adjuster increases and decreases operating pressure applied to the variable capacity portion. The pressure adjuster changes the capacity of the variable capacity portion to transport the powder. A powder measuring instrument measures an amount of the powder that replenishes the powder replenishment container. An operating pressure detector detects the operating pressure. A controller is operatively connected to the pressure adjuster, the powder measuring instrument, and the operating pressure detector. The controller performs a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount. The controller controls the pressure adjuster to replenish the powder replenishment container with the powder while the controller controls the pressure adjuster based on the operating pressure detected by the operating pressure detector in the precise replenishing mode.

This specification further describes an improved powder replenishing method. In one embodiment, the powder replenishing method includes storing powder in a powder storage, controlling a pressure adjuster to increase and decrease operating pressure applied to a variable capacity portion, changing a capacity of the variable capacity portion to transport the powder to a powder replenishment container, determining that the powder replenishment container is replenished with the powder in a predetermined amount, starting a precise replenishing mode, measuring an amount of the powder inside the powder replenishment container, detecting the operating pressure applied to the variable capacity portion, controlling the pressure adjuster based on the detected operating pressure, and controlling the pressure adjuster to replenish the powder replenishment container with the powder in a target amount.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2B is a diagram of the pneumatically driven pump and the solenoid valve depicted in FIG. 2A when the solenoid valve is turned on;

FIG. 7A is a part of a flowchart illustrating control processes for adjusting operating pressure, that are performed by the controller depicted in FIG. 4.

Figure 1:
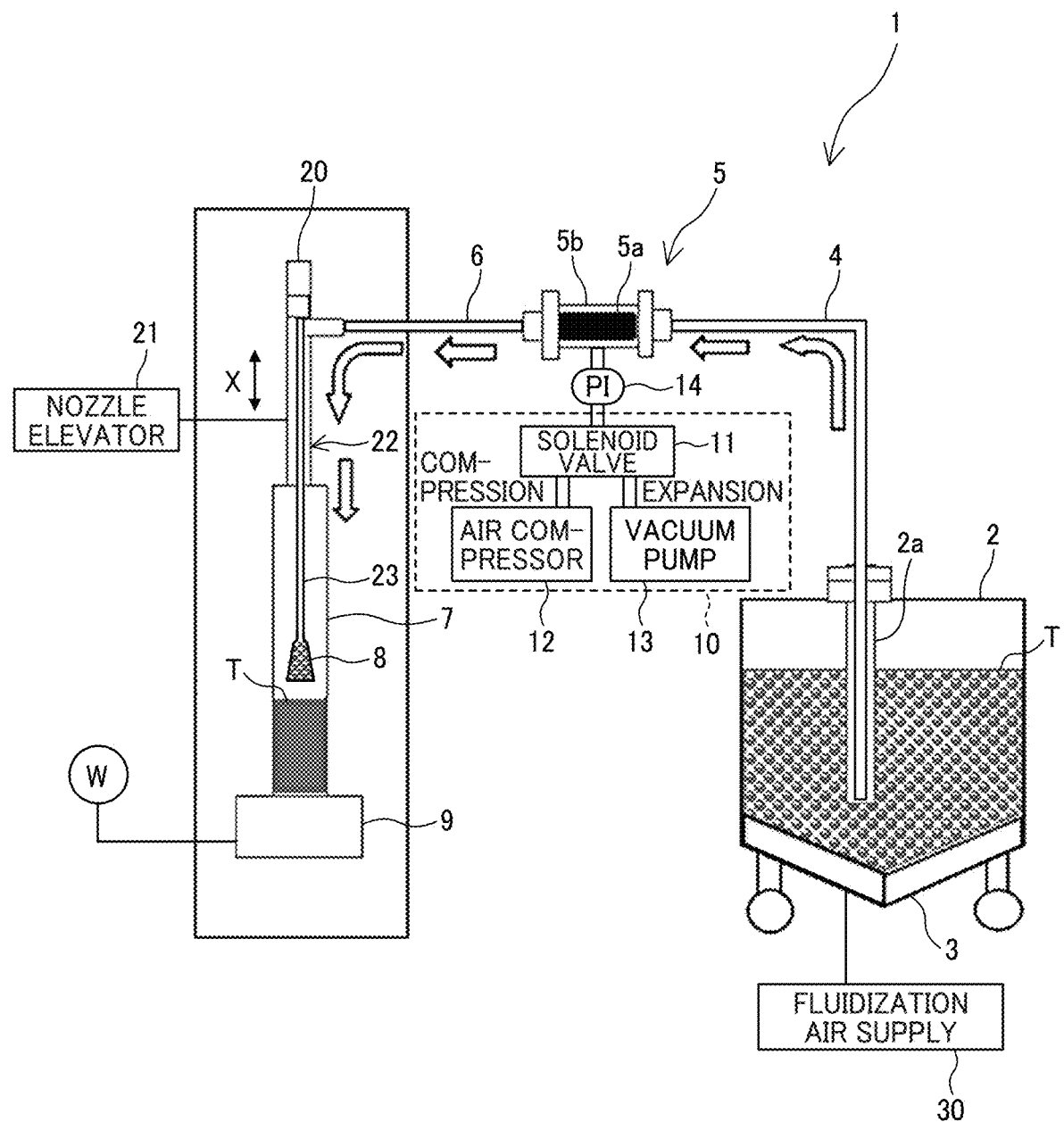
FIG. 1 is a schematic diagram of a toner replenisher according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is provided of a construction of a toner replenisher 1 serving as a powder replenisher according to an embodiment of the present disclosure.

FIG. 1 is a schematic diagram of the toner replenisher 1 according to the embodiment.

The toner replenisher 1 according to the embodiment includes a toner storage tank 2 and a toner replenishment container 7. The toner storage tank 2 serves as a powder storage that stores toner T serving as powder. The toner replenishment container 7 serves as a powder replenishment container that is replenished with the toner T. The toner replenisher 1 further includes a pneumatically driven pump 5 serving as a positive-displacement pump that transports the toner T from the toner storage tank 2 to the toner replenishment container 7. The toner replenisher 1 further includes a weighing scale 9 serving as a powder measuring instrument that measures an amount of the toner T replenishing the toner replenishment container 7. The weighing scale 9 is a load cell indicator including a weighing indicator W.

The toner storage tank 2 accommodates a toner injector tube 2a. The toner replenisher 1 further includes a toner suction tube 4. One end of the toner suction tube 4 is disposed inside the toner injector tube 2a. Another end of the toner suction tube 4 is coupled with the pneumatically driven pump 5. The toner replenisher 1 further includes a toner transport tube 6. One end of the toner transport tube 6 is coupled with the pneumatically driven pump 5. Another end of the toner transport tube 6 is coupled with a toner discharger 22 that discharges the toner T to the toner replenishment container 7.

The toner discharger 22 includes a nozzle tube 23 having a tip that is coupled with a nozzle 8. The toner replenisher 1 further includes a nozzle elevator 21 that lifts and lowers the toner discharger 22 in a direction X. The toner discharger 22 further includes a degassing pump 20 serving as a deaerator that removes air from the toner replenishment container 7.

The nozzle tube 23 has a double tube structure constructed of an inner tube and an outer tube. The inner tube receives the toner T transported from the toner transport tube 6. The outer tube receives air inside the toner replenishment container 7 sucked by the degassing pump 20.

The toner storage tank 2 includes a bottom that mounts a fluidization portion 3 that fluidizes the toner T. The fluidization portion 3 includes a ventilation plate and an air intake path. The ventilation plate includes a plurality of micropores that ejects air. The micropore has a size smaller than a particle size (e.g., a particle diameter) of the toner T. The air intake path sends air to the micropores of the ventilation plate. The fluidization portion 3 is coupled with a fluidization air supply 30. The fluidization air supply 30 sends air to the air intake path of the fluidization portion 3. The micropores of the ventilation plate eject air that fluidizes the toner T inside the toner storage tank 2. The fluidization air supply 30 that sends air to the air intake path of the fluidization portion 3 is an air compressor, a fan, a blower, or the like.

The pneumatically driven pump 5 is the positive-displacement pump that includes a transport tube 5a and an air chamber 5b. The transport tube 5a serves as a variable capacity portion that shrinks and expands by operating pressure. The air chamber 5b accommodates the transport tube 5a and applies operating pressure to the transport tube 5a. The transport tube 5a has both ends that mount check valves, respectively, that prevent the toner T from flowing backward.

The toner replenisher 1 further includes a pump driver 10 serving as a pressure adjuster or a pressure increasing-decreasing portion that intakes and exhausts air inside the air chamber 5b of the pneumatically driven pump 5 and changes pressure inside the air chamber 5b, thus driving the pneumatically driven pump 5. The pump driver 10 includes a 3-port solenoid valve 11 serving as a directional control valve, an air compressor 12, and a vacuum pump 13. The air compressor 12 sends compressed air into the air chamber 5b. The vacuum pump 13 releases air from the air chamber 5b.

Figure 2A:
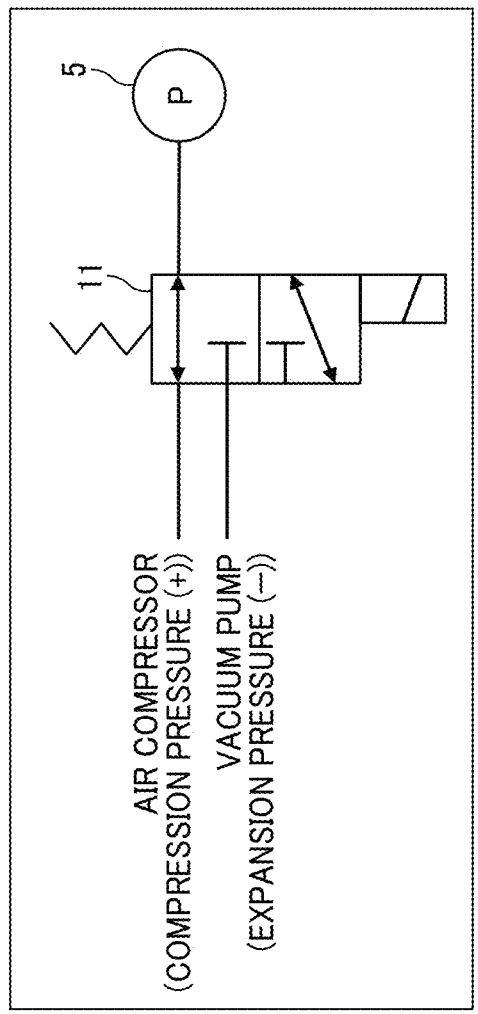
FIG. 2A is a diagram of a pneumatically driven pump and a solenoid valve incorporated in the toner replenisher depicted in FIG. 1 when the solenoid valve is turned off.
Figure 2B:
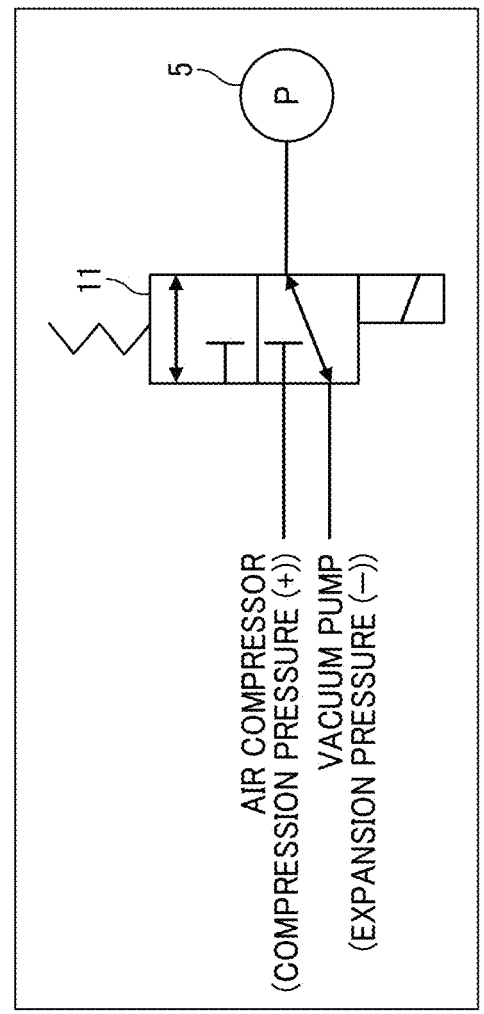

FIGS. 2A and 2B illustrate driving of the pneumatically driven pump 5.

As illustrated in FIG. 2A, when the solenoid valve 11 is turned off, the solenoid valve 11 blocks airflow from the vacuum pump 13 and releases airflow from the air compressor 12, sending compressed air into the air chamber 5b of the pneumatically driven pump 5. Accordingly, positive pressure inside the air chamber 5b increases, shrinking the transport tube 5a. Consequently, the toner T inside the transport tube 5a is discharged and transported into the toner transport tube 6.

As illustrated in FIG. 2B, when the solenoid valve 11 is turned on, the solenoid valve 11 blocks airflow from the air compressor 12 and releases airflow from the vacuum pump 13. The vacuum pump 13 deflates the air chamber 5b. Accordingly, the air chamber 5b has negative pressure that expands the transport tube 5a. Consequently, the transport tube 5a sucks the toner T from the toner storage tank 2, transporting the toner T through the toner suction tube 4 to the transport tube 5a.

Since the pneumatically driven pump 5 transports the toner T, compared to a conveying auger (e.g., a screw auger) that transports the toner T, the pneumatically driven pump 5 decreases stress such as pressure imposed on the toner T. Accordingly, the pneumatically driven pump 5 prevents an external additive to the toner T from being separated from or buried into a surface of the toner T, causing the external additive to achieve a target advantage. Additionally, the pneumatically driven pump 5 prevents toner particles of the toner T from adhering to each other, suppressing aggregation of the toner particles.

Figure 3:
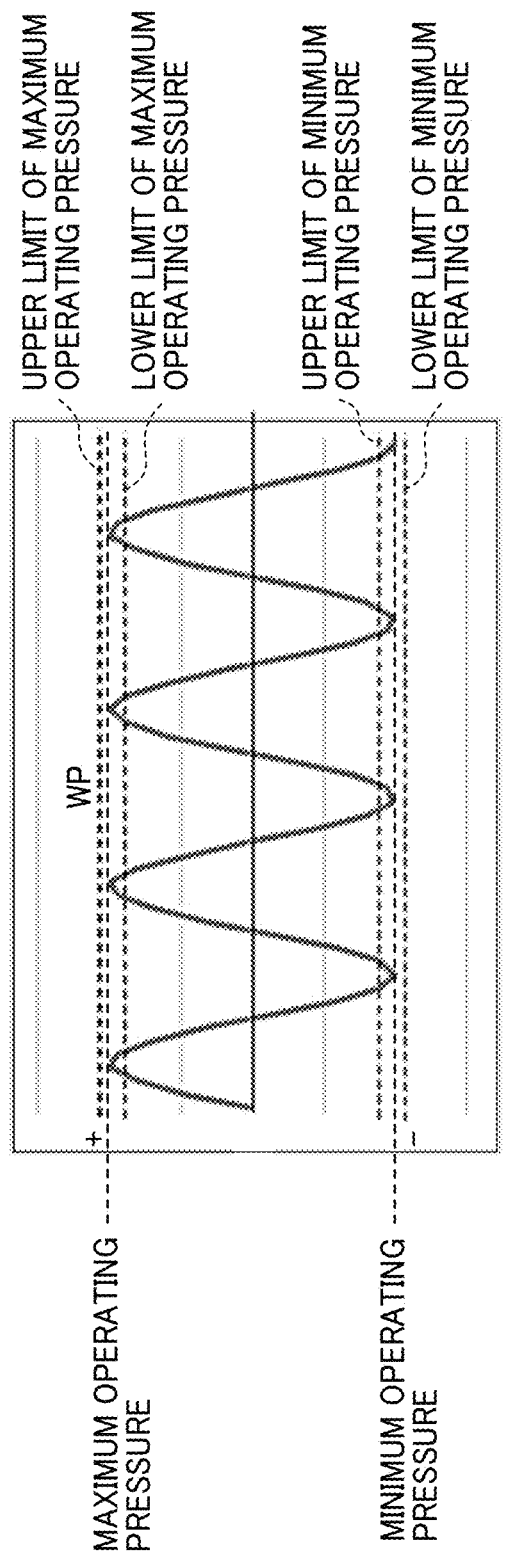
FIG. 3 is a diagram of a waveform of operating pressure as one example.

As the solenoid valve 11 is turned on and off, as illustrated in FIG. 3, the solenoid valve 11 changes operating pressure inside the air chamber 5b. Accordingly, the transport tube 5a shrinks and expands repeatedly, transporting the toner T from the toner storage tank 2 to the toner replenishment container 7 continuously. As a switching speed at which the solenoid valve 11 is turned on and off is changed, a replenishing speed at which the toner replenishment container 7 is replenished with the toner T is switched. For example, the replenishing speed defines a replenishing amount of the toner T per unit time in which the toner replenishment container 7 is replenished with the toner T.

According to the embodiment, as illustrated in FIG. 1, the toner replenisher 1 further includes a pressure gauge 14 (e.g., a pressure indicator (PI)) serving as an operating pressure detector that is disposed in an air channel interposed between the solenoid valve 11 and the pneumatically driven pump 5. The pressure gauge 14 detects pressure (e.g., operating pressure) inside the air chamber 5b. Based on the pressure detected by the pressure gauge 14, a controller 100 illustrated in FIG. 4 controls the air compressor 12 and the vacuum pump 13.

For example, as illustrated in FIG. 3, the controller 100 controls the air compressor 12 such that maximum operating pressure inside the air chamber 5b is greater than a lower limit of the maximum operating pressure and smaller than an upper limit of the maximum operating pressure. The controller 100 controls the vacuum pump 13 such that minimum operating pressure inside the air chamber 5b is greater than a lower limit of the minimum operating pressure and smaller than an upper limit of the minimum operating pressure.

Figure 4:
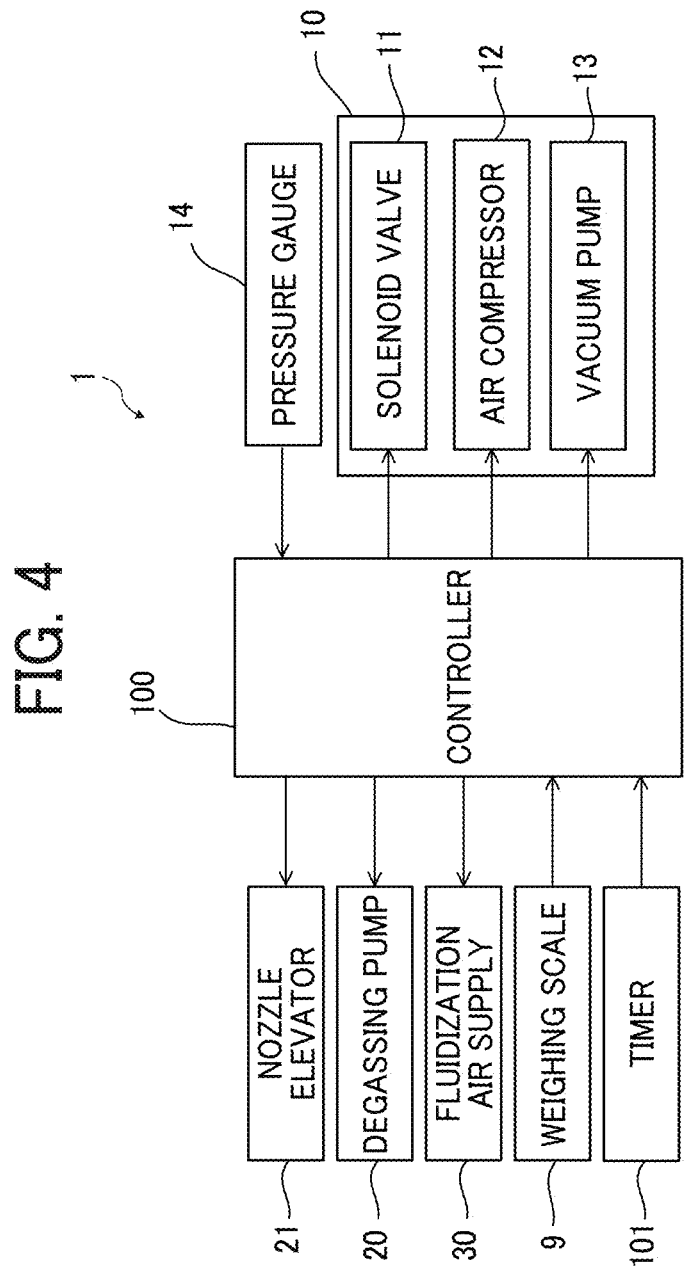
FIG. 4 is a block diagram of the toner replenisher depicted in FIG. 1, illustrating a controller that controls replenishing a toner replenishment container incorporated in the toner replenisher depicted in FIG. 1 with toner.

FIG. 4 is a block diagram of the toner replenisher 1, illustrating a control system that controls operations for replenishment with the toner T.

As illustrated in FIG. 4, the controller 100 includes a central processing unit (CPU), a random access memory (RAM), a read only memory (ROM), and a flash memory. The controller 100 controls driving of various devices of the toner replenisher 1 and performs various arithmetic processing. The controller 100 is electrically connected to the nozzle elevator 21, the degassing pump 20, the fluidization air supply 30, the weighing scale 9, a timer 101, the pressure gauge 14, the solenoid valve 11, the air compressor 12, the vacuum pump 13, and the like.

Figure 5:
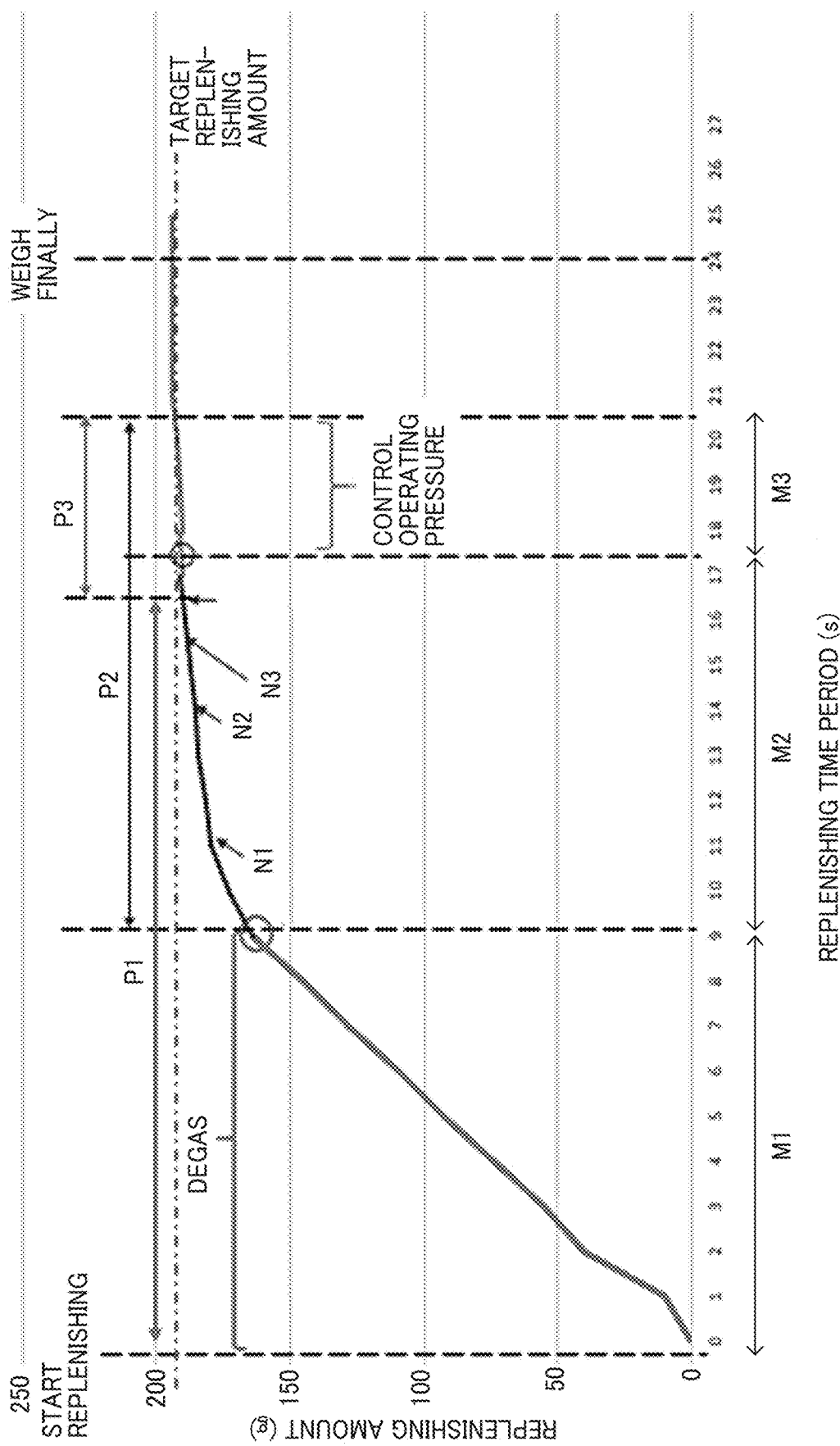
FIG. 5 is a graph illustrating a relation between a time period and a replenishing amount of the toner supplied to the toner replenishment container while the controller depicted in FIG. 4 controls replenishing the toner replenishment container with the toner.

FIG. 5 is a graph illustrating a relation between a replenishing amount and a replenishing time period of the toner T that replenishes the toner replenishment container 7 while the toner replenisher 1 performs replenishing of the toner T.

FIG. 5 illustrates a case in which the toner replenishment container 7 is replenished with the toner T in a replenishing amount of 190 g. FIG. 5 illustrates phases P1, P2, and P3. In the phase P1, the toner T in a replenishing amount up to approximately 185 g is supplied to the toner replenishment container 7 quickly. In the phase P3, after the toner replenishment container 7 is replenished with the toner T in the replenishing amount of approximately 185 g, the toner T in a replenishing amount up to a target replenishing amount of 190 g is supplied to the toner replenishment container 7 precisely. In the phase P2 after the toner replenishment container 7 is replenished with the toner T in a replenishing amount of approximately 170 g, the toner T is supplied carefully to prevent the toner replenishment container 7 from overflowing with the toner T due to variation in the replenishing speed and the like.

According to the embodiment, in order to supply the toner T to the toner replenishment container 7 quickly and precisely without overflowing, the toner replenisher 1 has a high-speed replenishing mode serving as an initial replenishing mode, a deceleration replenishing mode, and a precise replenishing mode. The high-speed replenishing mode defines degassing replenishing that replenishes the toner replenishment container 7 with the toner T while the degassing pump 20 removes air from the toner replenishment container 7. In FIG. 5, M1 indicates the high-speed replenishing mode, as time-based replenishing, in which the controller 100 controls the degassing pump 20 to degas the toner replenishment container 7. M2 indicates the deceleration replenishing mode as amount-based replenishing. M3 indicates the precise replenishing mode, as amount-based replenishing, in which the controller 100 controls the pump driver 10 to adjust operating pressure.

As replenishment with the toner T starts, the controller 100 drives the fluidization air supply 30 that fluidizes the toner T inside the toner storage tank 2 with air. The controller 100 turns on or off the solenoid valve 11 at a high speed and drives the air compressor 12 and the vacuum pump 13.

As the switching speed at which the controller 100 switches turning on and off of the solenoid valve 11 changes, a cycle for changing positive pressure and negative pressure of operating pressure periodically inside the air chamber 5b of the pneumatically driven pump 5 changes. Accordingly, a discharge amount per unit time of the toner T discharged from the pneumatically driven pump 5 changes, thus changing the replenishing speed of the toner T. According to the embodiment, in the high-speed replenishing mode, the controller 100 switches turning on and off of the solenoid valve 11 at a high switching speed, replenishing the toner replenishment container 7 with the toner T at a high replenishing speed of the toner T. In the deceleration replenishing mode, the controller 100 switches turning on and off of the solenoid valve 11 at a low switching speed that is lower than the high switching speed in the high-speed replenishing mode, replenishing the toner replenishment container 7 with the toner T at a low replenishing speed of the toner T, that is lower than the high replenishing speed in the high-speed replenishing mode. In the precise replenishing mode, the controller 100 switches turning on and off of the solenoid valve 11 at a low switching speed that is lower than the low switching speed in the deceleration replenishing mode, replenishing the toner replenishment container 7 with the toner T at a low replenishing speed of the toner T, that is lower than the low replenishing speed in the deceleration replenishing mode.

In the high-speed replenishing mode, the weighing scale 9 does not weigh the replenishing amount of the toner T that replenishes the toner replenishment container 7. The toner T is supplied to the toner replenishment container 7 until a target time measured by the timer 101. With degassing replenishing, the degassing pump 20 intakes air and sucks up the toner T inside the toner replenishment container 7. Hence, the weighing scale 9 does not weigh the replenishing amount of the toner T inside the toner replenishment container 7 precisely. Accordingly, if the toner replenisher 1 replenishes the toner replenishment container 7 with the toner T in the high-speed replenishing mode until the replenishing amount of the toner T inside the toner replenishment container 7, that is weighed by the weighing scale 9, reaches a desired replenishing amount, at worst, the toner T may overflow the toner replenishment container 7. In order to prevent the toner T from overflowing the toner replenishment container 7, if the controller 100 decreases the desired replenishing amount in the high-speed replenishing mode, a time period used in the deceleration replenishing mode may increase, resulting in an increased replenishing time period. Hence, in the high-speed replenishing mode that performs degassing replenishing, the controller 100 does not control the weighing scale 9 to weigh the replenishing amount of the toner T, thus replenishing the toner replenishment container 7 with the toner T.

However, if operating pressure inside the air chamber 5b of the pneumatically driven pump 5 changes, for example, the discharge amount of the toner T discharged from the pneumatically driven pump 5 changes. Accordingly, the replenishing speed of the toner T (e.g., the replenishing amount of the toner T per unit time) changes. As the replenishing speed of the toner T increases, variation in the replenishing speed of the toner T increases. Accordingly, when the toner T is supplied to the toner replenishment container 7 for the target time period in the high-speed replenishing mode in which the toner T is supplied to the toner replenishment container 7 at a high speed, variation in the replenishing amount of the toner T inside the toner replenishment container 7 may increase.

To address the circumstances described above, according to the embodiment, in order to suppress variation in the replenishing amount of the toner T inside the toner replenishment container 7 when the toner T is supplied to the toner replenishment container 7 for the target time period, the controller 100 determines the target time period based on an average of last three replenishing speeds of the toner T in the high-speed replenishing mode. For example, the controller 100 includes a nonvolatile memory that stores the last three replenishing speeds of the toner T in the high-speed replenishing mode. When the high-speed replenishing mode finishes as the toner T is supplied to the toner replenishment container 7 for the target time period, the controller 100 stops the degassing pump 20 and controls the nozzle elevator 21 to lift the nozzle 8 so that the nozzle 8 is situated above the toner T inside the toner replenishment container 7. Subsequently, the controller 100 calculates a replenishing speed of the toner T based on a replenishing amount of the toner T inside the toner replenishment container 7, that is weighed by the weighing scale 9, and an instant target time period. The controller 100 deletes an oldest replenishing speed of the toner T of the last three replenishing speeds of the toner T in the high-speed replenishing mode, that are stored in the nonvolatile memory. The controller 100 controls the nonvolatile memory to store the calculated replenishing speed of the toner T. When the controller 100 performs the high-speed replenishing mode, the controller 100 calculates the average of the last three replenishing speeds of the toner T in the high-speed replenishing mode, that are stored in the nonvolatile memory. The controller 100 calculates the target time period based on the calculated average and the desired replenishing amount of the toner T in the high-speed replenishing mode.

As described above, in order to calculate the target time period, the controller 100 uses the average of the last three replenishing speeds of the toner T in the high-speed replenishing mode. Alternatively, the controller 100 may use last four or more data to calculate the average.

As described above, the controller 100 determines the target time period in the high-speed replenishing mode by using the average of the plurality of last replenishing speeds of the toner T in the high-speed replenishing mode. Hence, even if the replenishing speed of the toner T changes, the target time period changes automatically. Accordingly, the controller 100 suppresses variation in the replenishing amount of the toner T in the high-speed replenishing mode with respect to the desired replenishing amount. Consequently, the controller 100 prevents the replenishing amount of the toner T in the high-speed replenishing mode from decreasing from the desired replenishing amount excessively, prevents the subsequent, deceleration replenishing mode from extending, and prevents the replenishing time period of the toner T from extending. Additionally, the controller 100 prevents the replenishing amount of the toner T in the high-speed replenishing mode from increasing from the desired replenishing amount of the toner T excessively and prevents the toner T from overflowing the toner replenishment container 7.

When the high-speed replenishing mode finishes, the controller 100 performs the deceleration replenishing mode in which the replenishing speed of the toner T (e.g., the switching speed of the solenoid valve 11) is lower than the replenishing speed of the toner T in the high-speed replenishing mode. The deceleration replenishing mode performs weighing replenishing that does not degas and supplies the toner T while the weighing scale 9 weighs the replenishing amount of the toner T inside the toner replenishment container 7. Since the deceleration replenishing mode does not degas, the weighing scale 9 weighs the replenishing amount of the toner T inside the toner replenishment container 7 precisely. Thus, the controller 100 replenishes the toner replenishment container 7 with the toner T in a predetermined amount precisely.

Since the controller 100 decreases the replenishing speed of the toner T in the deceleration replenishing mode compared to the high-speed replenishing mode, the controller 100 suppresses variation in the replenishing amount of the toner T, that is caused by change in the replenishing speed of the toner T. Hence, the controller 100 prevents the toner T in a replenishing amount greater than the target replenishing amount from being supplied to the toner replenishment container 7 and prevents the toner T from overflowing the toner replenishment container 7. In the deceleration replenishing mode, the controller 100 decreases the replenishing speed of the toner T stepwise three times, that is, a first deceleration time N1, a second deceleration time N2, and a third deceleration time N3 illustrated in FIG. 5, preventing the toner T from overflowing the toner replenishment container 7. Thus, the controller 100 replenishes the toner replenishment container 7 with the toner T in the predetermined amount early. At the third deceleration time N3 at which the controller 100 decreases the replenishing speed of the toner T, the controller 100 supplies the toner T to the toner replenishment container 7 at a replenishing speed that is decreased sufficiently, thus replenishing the toner replenishment container 7 with the toner T precisely to some extent. Accordingly, as illustrated in FIG. 5, the controller 100 performs the deceleration replenishing mode until the toner replenishment container 7 is replenished with the toner T in a replenishing amount that is not smaller than a replenishing amount of the toner T with which the controller 100 starts the precise replenishing mode. Hence, the controller 100 shortens a time period of the precise replenishing mode, shortening the replenishing time period of the toner T.

Figure 6:
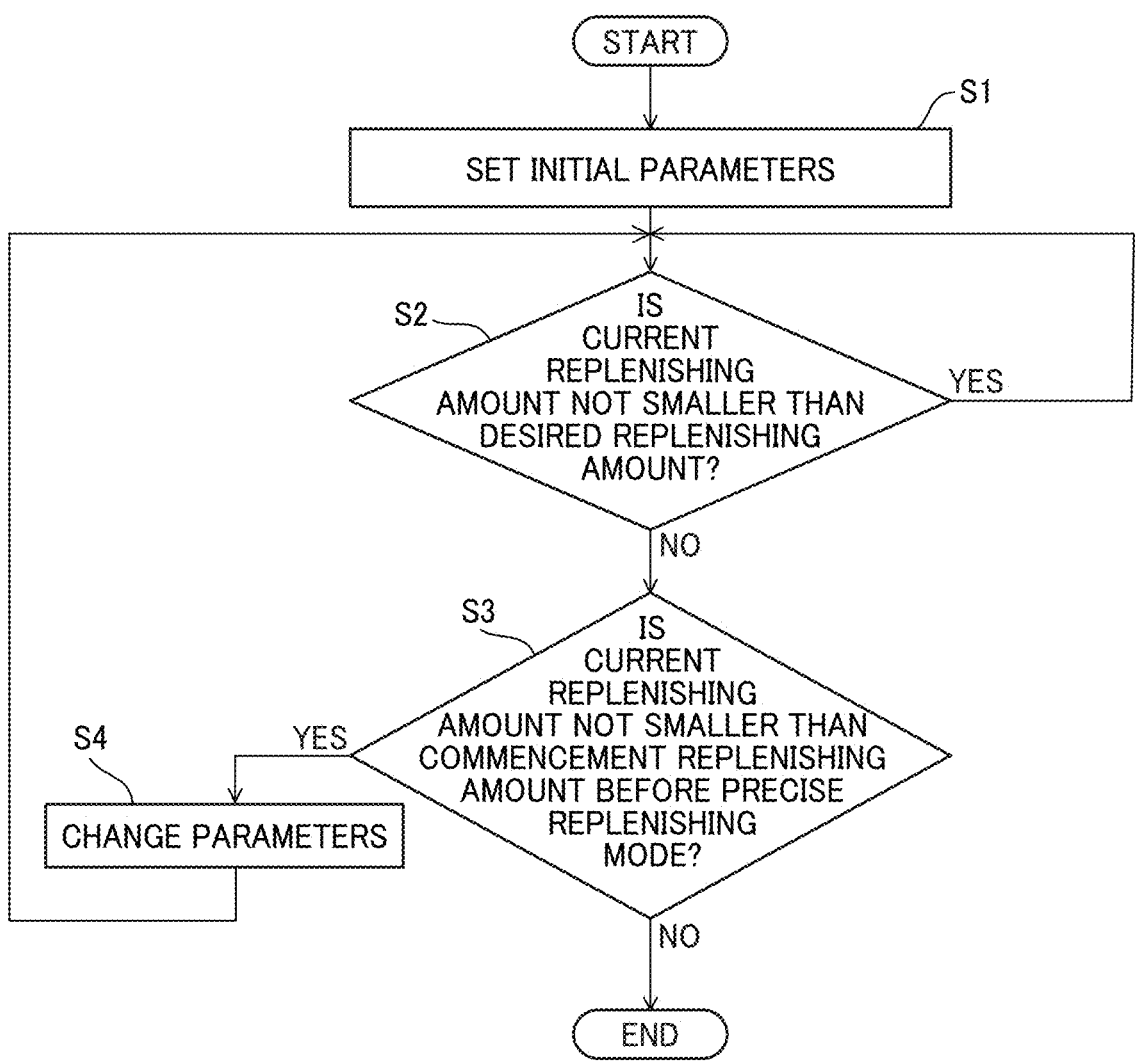
FIG. 6 is a flowchart illustrating control processes in a deceleration replenishing mode performed by the controller depicted in FIG. 4.

FIG. 6 is a flowchart of control processes of the deceleration replenishing mode.

As described above, when the controller 100 finishes the high-speed replenishing mode, the controller 100 stops the degassing pump 20, controls the nozzle elevator 21 to lift the nozzle 8 so that the nozzle 8 is situated above the toner T inside the toner replenishment container 7. Subsequently, the controller 100 controls the weighing scale 9 to weigh the replenishing amount of the toner T in the high-speed replenishing mode. Subsequently, the controller 100 reads initial parameters from the nonvolatile memory and calculates a replenishing amount of the toner T at a decreased replenishing speed and the like based on the calculated replenishing amount of the toner T in step S1.

As illustrated in FIG. 6, the controller 100 sets the initial parameters in step S1. The initial parameters include a first parameter, a second parameter, a third parameter, a fourth parameter, a fifth parameter, a sixth parameter, and a seventh parameter. As the first parameter, a number of deceleration times is three. Whenever the controller 100 changes the replenishing speed of the toner T (e.g., the switching speed of the solenoid valve 11), the controller 100 decrements the number of deceleration times. The switching speed defines a speed for switching turning on and off of the solenoid valve 11. As the controller 100 changes the switching speed of the solenoid valve 11, the cycle for changing positive pressure and negative pressure of operating pressure periodically inside the air chamber 5b of the pneumatically driven pump 5 changes. Accordingly, the discharge amount per unit time of the toner T discharged from the pneumatically driven pump 5 changes, thus changing the replenishing speed of the toner T.

The switching speed at the first deceleration time N1 at which the controller 100 decreases the replenishing speed of the toner T as the second parameter defines a switching speed at an initial deceleration, that is, the first deceleration time N1. At the second deceleration time N2 at which controller 100 decreases the replenishing speed of the toner T, the controller 100 changes the switching speed to a decreased switching speed that is lower than the switching speed applied at the first deceleration time N1. At the third deceleration time N3 at which the controller 100 decreases the replenishing speed of the toner T, the controller 100 changes the switching speed to a decreased switching speed that is lower than the decreased switching speed applied at the second deceleration time N2. The controller 100 calculates the decreased switching speed at the second deceleration time N2 by subtracting a deceleration value from the switching speed at the first deceleration time N1. The deceleration value, as the third parameter, is calculated by a formula (1) below.

$$Dv=(Is-Ps)/3 \qquad (1)$$

In the formula (1), Dv represents the deceleration value. Is represents the switching speed at the initial deceleration, that is, the first deceleration time N1. Ps represents the switching speed in the precise replenishing mode. The controller 100 calculates the decreased switching speed at the third deceleration time N3 by subtracting the deceleration value from the decreased switching speed at the second deceleration time N2.

The replenishing amount at the decreased switching speed as the fourth parameter defines the replenishing amount of the toner T in the deceleration replenishing mode. The controller 100 calculates the replenishing amount at the decreased switching speed by subtracting the replenishing amount of the toner T in the high-speed replenishing mode from a commencement replenishing amount before the precise replenishing mode, that is, a replenishing amount of the toner T when the deceleration replenishing mode finishes.

The controller 100 calculates an additional weight, as the fifth parameter, by dividing the calculated replenishing amount at the decreased switching speed by 14. The controller 100 calculates an additional value, as the sixth parameter, according to a formula (2) below.

$$Av=N \times N \times Aw \qquad (2)$$

In the formula (2), Av represents the additional value. N represents the number of deceleration times. Aw represents the additional weight. As described above, the number of deceleration times is three at the first deceleration time N1, two at the second deceleration time N2, and one at the third deceleration time N3. Hence, as indicated by the formula (2) that calculates the additional value, as the number of deceleration times increases, the additional value decreases.

The controller 100 calculates a desired replenishing amount as the seventh parameter. The desired replenishing amount defines a target replenishing amount set for each time for decreasing the replenishing speed. In step S2, the controller 100 determines if a current replenishing amount of the toner T is not smaller than the desired replenishing amount. If the controller 100 determines that the current replenishing amount of the toner T is not smaller than the desired replenishing amount (NO in step S2), the controller 100 switches the switching speed. At the first deceleration time N1 at which the controller 100 decreases the replenishing speed of the toner T, the controller 100 calculates the desired replenishing amount by adding the additional value described above to the replenishing amount in the high-speed replenishing mode. At the second deceleration time N2 at which the controller 100 decreases the replenishing speed of the toner T, the controller 100 calculates the desired replenishing amount by adding the additional value to the desired replenishing amount at the first deceleration time N1. At the third deceleration time N3 at which the controller 100 decreases the replenishing speed of the toner T, the controller 100 calculates the desired replenishing amount by adding the additional value to the desired replenishing amount at the second deceleration time N2. The desired replenishing amount at the third deceleration time N3 is equivalent to the commencement replenishing amount before the precise replenishing mode.

After the controller 100 sets the initial parameters for the first deceleration time N1, the controller 100 switches the solenoid valve 11 at the switching speed at the initial deceleration, thus supplying the toner T at the first deceleration time N1 at the replenishing speed of the toner T that is lower than the replenishing speed of the toner T in the high-speed replenishing mode.

If the controller 100 determines that the current replenishing amount of the toner T inside the toner replenishment container 7, that is weighed by the weighing scale 9, is not smaller than the desired replenishing amount at the first deceleration time N1 (NO in step S2), the controller 100 determines if the current replenishing amount of the toner T inside the toner replenishment container 7 is not smaller than the commencement replenishing amount before the precise replenishing mode in step S3. If the controller 100 determines that the current replenishing amount of the toner T inside the toner replenishment container 7 is smaller than the commencement replenishing amount before the precise replenishing mode (YES in step S3), the controller 100 changes four parameters, that is, an eighth parameter, a ninth parameter, a tenth parameter, and an eleventh parameter, described below in step S4. The eighth parameter defines a number of deceleration times for decreasing the replenishing speed of the toner T. The ninth parameter defines a switching speed of the solenoid valve 11. The tenth parameter defines an additional value. The eleventh parameter defines a desired replenishing amount of the toner T.

For example, the controller 100 decrements the number of deceleration times from three to two. The controller 100 changes the switching speed of the solenoid valve 11 to a switching speed at the second deceleration time N2 obtained by subtracting the deceleration value from the switching speed at the initial deceleration (e.g., the first deceleration time N1) as the current switching speed. The controller 100 recalculates the additional value. The controller 100 adds the recalculated additional value to the desired replenishing amount at the first deceleration time N1, calculating a desired replenishing amount at the second deceleration time N2. The controller 100 switches turning on and off of the solenoid valve 11 at the switching speed at the second deceleration time N2, that is changed. Thus, the controller 100 performs replenishing at the second deceleration time N2 at a replenishing speed of the toner T, that is lower than the replenishing speed of the toner T at the first deceleration time N1.

If the controller 100 determines that the current replenishing amount of the toner T inside the toner replenishment container 7, that is weighed by the weighing scale 9, is not smaller than the desired replenishing amount at the second deceleration time N2 (NO in step S2), the controller 100 determines if the current replenishing amount of the toner T inside the toner replenishment container 7 is smaller than the commencement replenishing amount before the precise replenishing mode. If the controller 100 determines that the current replenishing amount of the toner T inside the toner replenishment container 7 is smaller than the commencement replenishing amount before the precise replenishing mode (YES in step S3), the controller 100 changes the parameters as described above in step S4. That is, the controller 100 changes the switching speed of the solenoid valve 11 to a switching speed at the third deceleration time N3 obtained by subtracting the deceleration value from the switching speed at the second deceleration time N2 as the current switching speed. The controller 100 decrements the number of deceleration times from two to one. The controller 100 recalculates the additional value. The controller 100 adds the additional value to the desired replenishing amount at the second deceleration time N2, thus calculating a desired replenishing amount at the third deceleration time N3. As described above, the desired replenishing amount at the third deceleration time N3 is equivalent to the commencement replenishing amount before the precise replenishing mode.

The controller 100 switches turning on and off of the solenoid valve 11 at the changed switching speed at the third deceleration time N3, thus performing replenishment at the third deceleration time N3 at the replenishing speed of the toner T, that is lower than the replenishing speed at the second deceleration time N2. At the third deceleration time N3, the desired replenishing amount is equivalent to the commencement replenishing amount before the precise replenishing mode. Hence, if the controller 100 determines that the current replenishing amount of the toner T inside the toner replenishment container 7, that is weighed by the weighing scale 9, is not smaller than the desired replenishing amount at the third deceleration time N3 (NO in step S2), the controller 100 determines that the current replenishing amount of the toner T is not smaller than the commencement replenishing amount before the precise replenishing mode (NO in step S3). Thus, the controller 100 finishes the deceleration replenishing mode and starts the precise replenishing mode.

At the first deceleration time N1 and the second deceleration time N2 also, if the controller 100 determines that the current replenishing amount of the toner T, that is weighed by the weighing scale 9, is not smaller than the commencement replenishing amount before the precise replenishing mode (NO in step S3), the controller 100 finishes the deceleration replenishing mode and starts the precise replenishing mode.

In the precise replenishing mode, the controller 100 decreases the switching speed of the solenoid valve 11 to a switching speed that is even lower than the switching speed at the third deceleration time N3, thus performing replenishing at a decreased replenishing speed. In the precise replenishing mode also, the controller 100 does not cause the degassing pump 20 to degas and causes the weighing scale 9 to weigh the replenishing amount of the toner T inside the toner replenishment container 7, thus performing weighing replenishing.

As illustrated in FIG. 5, the weighing scale 9 performs final weighing when several seconds elapse after the controller 100 finishes the precise replenishing mode. Even after the precise replenishing mode finishes and the pneumatically driven pump 5 stops, the toner T inside the toner transport tube 6 and the nozzle tube 23 moves to the toner replenishment container 7. Thus, the toner replenishment container 7 is replenished with the toner T. Hence, the weighing scale 9 may not weigh the toner T stably, immediately after the precise replenishing mode finishes. To address the circumstance, after the toner T inside the toner transport tube 6 and the nozzle tube 23 falls into the toner replenishment container 7 so that the weighing scale 9 weighs the toner T stably, the weighing scale 9 performs final weighing. The controller 100 performs final determination that the toner T inside the toner replenishment container 7 attains a replenishing amount within an error of the target replenishing amount.

As described above, even after the pneumatically driven pump 5 stops, the toner T is supplied to the toner replenishment container 7. Hence, the desired replenishing amount in the precise replenishing mode is slightly smaller than the target replenishing amount. For example, the desired replenishing amount in the precise replenishing mode is set as described below. Based on the replenishing speed set in the precise replenishing mode, the controller 100 determines an amount of the toner T inside the toner transport tube 6 and the nozzle tube 23 when the pneumatically driven pump 5 stops. The controller 100 subtracts the determined amount of the toner T inside the toner transport tube 6 and the nozzle tube 23 from the target replenishing amount, obtaining the desired replenishing amount in the precise replenishing mode.

However, the pneumatically driven pump 5 may have operating pressure that deviates from target operating pressure due to various factors. The pneumatically driven pump 5 may have an uneven discharge amount and an unstable replenishing speed. If the toner T inside the transport tube 5a of the pneumatically driven pump 5 has a toner density that varies, the operating pressure also varies. If the toner T inside the transport tube 5a has the toner density that varies, the discharge amount of the pneumatically driven pump 5 also varies.

As described above, variation in operating pressure destabilizes the replenishing speed. Hence, when the pneumatically driven pump 5 stops, the amount of the toner T inside the toner transport tube 6 and the nozzle tube 23 varies. Accordingly, after the precise replenishing mode finishes and the pneumatically driven pump 5 stops, the amount of the toner T supplied to the toner replenishment container 7 varies. The replenishing amount of the toner T inside the toner replenishment container 7 may deviate from the error of the target replenishing amount. Thus, the weighing scale 9 may perform faulty final weighing.

To address the circumstances, according to the embodiment, in the precise replenishing mode, based on pressure (e.g., operating pressure) inside the air chamber 5b, that is measured with the pressure gauge 14, the controller 100 performs feedback control on the air compressor 12 and the vacuum pump 13. For example, in order to adjust maximum operating pressure and minimum operating pressure inside the air chamber 5b of the pneumatically driven pump 5 within a range between the lower limit and the upper limit of the maximum operating pressure and a range between the lower limit and the upper limit of the minimum operation pressure illustrated in FIG. 3, respectively, the controller 100 controls the air compressor 12 and the vacuum pump 13, retaining constant peak-to-peak operating pressure.

Figure 7B:
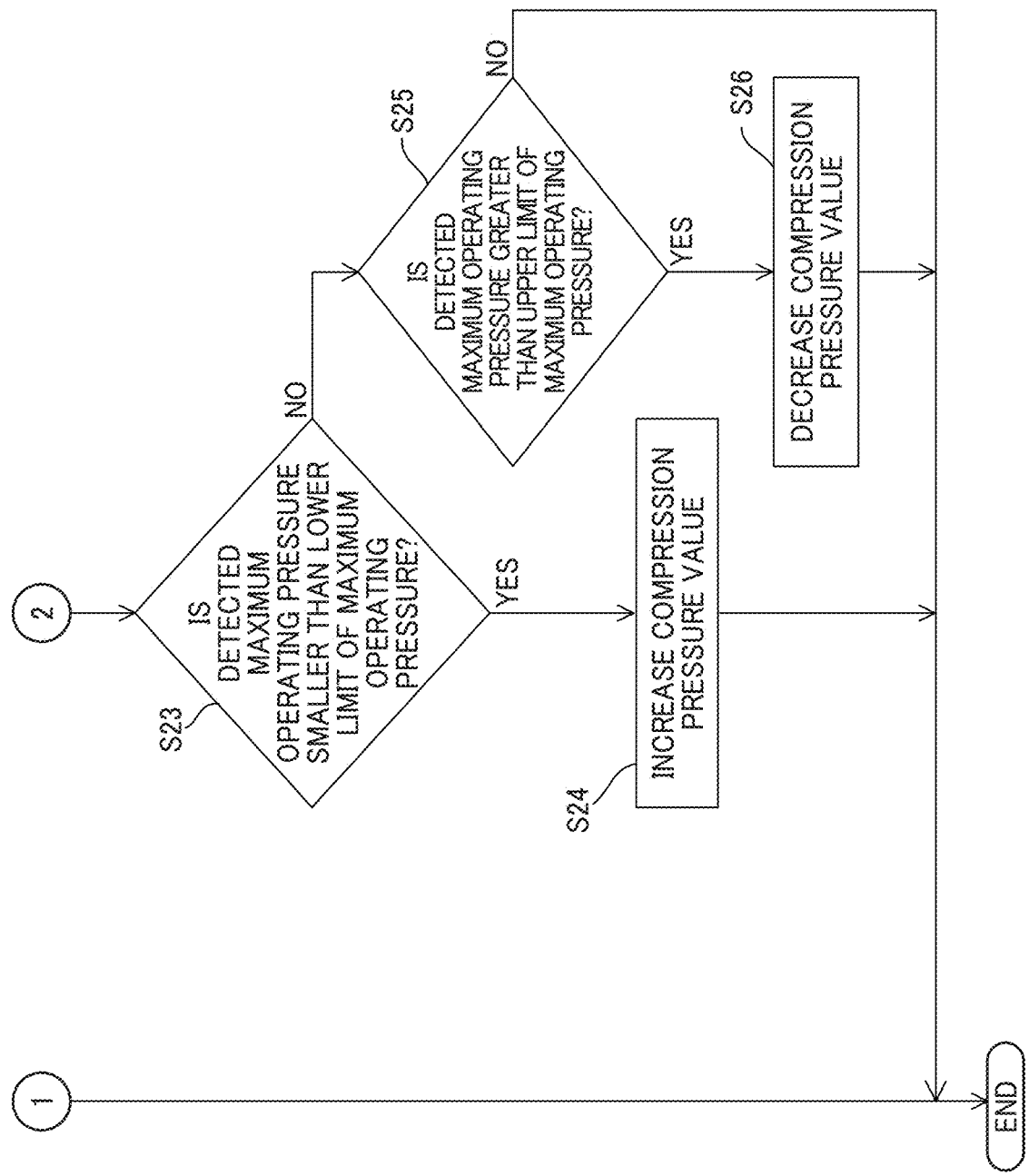
FIG. 7B is another part of the flowchart illustrating the control processes for adjusting operating pressure, that are performed by the controller depicted in FIG. 4.

FIGS. 7A and 7B illustrate a flowchart illustrating control processes for adjusting operating pressure.

When the precise replenishing mode starts, the controller 100 causes the pressure gauge 14 to monitor operating pressure inside the air chamber 5b of the pneumatically driven pump 5. The pressure gauge 14 obtains an operating pressure waveform WP illustrated in FIG. 3. The controller 100 monitors a plurality of periods (e.g., three periods according to the embodiment) of the operating pressure waveform WP obtained by the pressure gauge 14. The controller 100 detects maximum operating pressure as greatest operating pressure and minimum operating pressure as smallest operating pressure within the plurality of periods.

As illustrated in FIGS. 7A and 7B, in step S11, the controller 100 determines if the detected minimum operating pressure is smaller than the lower limit of the minimum operating pressure. If the controller 100 determines that the detected minimum operating pressure is smaller than the lower limit of the minimum operating pressure (YES in step S11), the controller 100 determines if the detected maximum operating pressure is smaller than the lower limit of the maximum operating pressure in step S12. If the controller 100 determines that the detected maximum operating pressure is smaller than the lower limit of the maximum operating pressure (YES in step S12), the controller 100 adjusts a compression pressure value and an expansion pressure value. For example, in step S13, the controller 100 adds a predetermined additional compression value to a compression pressure value as discharge pressure of compressed air generated by the air compressor 12, that is currently set, thus calculating a new compression pressure value by increasing the compression pressure value that is currently set. Additionally, in step S13, the controller 100 subtracts a predetermined subtraction expansion value from an expansion pressure value as suction pressure of air released by the vacuum pump 13, that is currently set, thus calculating a new expansion pressure value by decreasing the expansion pressure value that is currently set.

If the controller 100 determines that the detected maximum operating pressure is not smaller than the lower limit of the maximum operating pressure (NO in step S12), the controller 100 determines if the detected maximum operating pressure is greater than the upper limit of the maximum operating pressure in step S14. If the controller 100 determines that the detected maximum operating pressure is greater than the upper limit of the maximum operating pressure (YES in step S14), the controller 100 decreases the compression pressure value and the expansion pressure value. For example, in step S15, the controller 100 subtracts a predetermined subtraction compression value from the compression pressure value of compressed air, that is currently set. Additionally, in step S15, the controller 100 subtracts the predetermined subtraction expansion value from the expansion pressure value that is currently set.

If the controller 100 determines that the detected maximum operating pressure is not greater than the upper limit of the maximum operating pressure (NO in step S14), the controller 100 determines that the maximum operating pressure is within a target range. Hence, the controller 100 does not adjust the compression pressure value and subtracts the predetermined subtraction expansion value from the expansion pressure value that is currently set in step S16, thus decreasing the expansion pressure value.

If the controller 100 determines that the detected minimum operating pressure is not smaller than the lower limit of the minimum operating pressure (NO in step S11), the controller 100 determines if the detected minimum operating pressure is greater than the upper limit of the minimum operating pressure in step S17. If the controller 100 determines that the detected minimum operating pressure is greater than the upper limit of the minimum operating pressure (YES in step S17), the controller 100 determines if the detected maximum operating pressure is smaller than the lower limit of the maximum operating pressure in step S18. If the controller 100 determines that the detected maximum operating pressure is smaller than the lower limit of the maximum operating pressure (YES in step S18), the controller 100 increases the compression pressure value and the expansion pressure value in step S19. For example, the controller 100 adds the predetermined additional compression value to the compression pressure value that is currently set. Additionally, the controller 100 adds a predetermined additional expansion value to the expansion pressure value that is currently set.

If the controller 100 determines that the detected maximum operating pressure is not smaller than the lower limit of the maximum operating pressure (NO in step S18), the controller 100 determines if the detected maximum operating pressure is greater than the upper limit of the maximum operating pressure in step S20. If the controller 100 determines that the detected maximum operating pressure is greater than the upper limit of the maximum operating pressure (YES in step S20), the controller 100 decreases the compression pressure value and increases the expansion pressure value in step S21. For example, the controller 100 subtracts the predetermined subtraction compression value from the compression pressure value that is currently set. Additionally, the controller 100 adds the predetermined additional expansion value to the expansion pressure value that is currently set.

If the controller 100 determines that the detected maximum operating pressure is not greater than the upper limit of the maximum operating pressure (NO in step S20), the controller 100 determines that the maximum operating pressure is within the target range. Accordingly, the controller 100 does not adjust the compression pressure value and adds the predetermined additional expansion value to the expansion pressure value that is currently set in step S22, thus increasing the expansion pressure value that is currently set.

If the controller 100 determines that the detected minimum operating pressure is not greater than the upper limit of the minimum operating pressure (NO in step S17), the controller 100 determines that the minimum operating pressure is within a target range. Accordingly, the controller 100 does not adjust the expansion pressure value. In step S23, the controller 100 determines if the detected maximum operating pressure is smaller than the lower limit of the maximum operating pressure. If the controller 100 determines that the detected maximum operating pressure is smaller than the lower limit of the maximum operating pressure (YES in step S23), the controller 100 increases the compression pressure value in step S24. For example, the controller 100 adds the additional compression pressure value to the compression pressure value that is currently set. Conversely, if the controller 100 determines that the detected maximum operating pressure is not smaller than the lower limit of the maximum operating pressure (NO in step S23), the controller 100 determines if the maximum operating pressure is greater than the upper limit of the maximum operating pressure in step S25. If the controller 100 determines that the maximum operating pressure is greater than the upper limit of the maximum operating pressure (YES in step S25), the controller 100 decreases the compression pressure value. For example, the controller 100 subtracts the subtraction compression value from the compression pressure value that is currently set in step S26.

Conversely, if the controller 100 determines that the maximum operating pressure is not greater than the upper limit of the maximum operating pressure (NO in step S25), the controller 100 determines that each of the minimum operating pressure and the maximum operating pressure is within the target range. Accordingly, the controller 100 does not adjust the compression pressure value and the expansion pressure value.

The controller 100 controls the vacuum pump 13 to attain the expansion pressure value (e.g., intake pressure) set by the control processes in the flowchart in FIGS. 7A and 7B.

The controller 100 controls the air compressor 12 to attain the compression pressure value (e.g., the discharge pressure) set by the control processes in the flowchart in FIGS. 7A and 7B.

If the controller 100 determines that the detected minimum operating pressure is smaller than the lower limit of the minimum operating pressure (YES in step S11), as illustrated in steps S13, S15, and S16 in FIGS. 7A and 7B, the controller 100 subtracts the predetermined subtraction expansion value from the expansion pressure value that is currently set, thus decreasing the expansion pressure (e.g., the intake pressure) of the vacuum pump 13. As the expansion pressure (e.g., the intake pressure) decreases, the vacuum pump 13 decreases negative pressure inside the air chamber 5b. The minimum operating pressure increases to a value not smaller than the lower limit of the minimum operating pressure. Accordingly, the controller 100 adjusts the minimum operating pressure to a value between the lower limit and the upper limit of the minimum operating pressure.

If the controller 100 determines that the detected minimum operating pressure is greater than the upper limit of the minimum operating pressure (YES in step S17), the controller 100 adds the predetermined additional expansion value to the expansion pressure value that is currently set, thus increasing the expansion pressure (e.g., the intake pressure) of the vacuum pump 13 in steps S19, S21, and S22. As the expansion pressure (e.g., the intake pressure) increases, the vacuum pump 13 increases negative pressure inside the air chamber 5b, decreasing the minimum operating pressure to a value not greater than the upper limit of the minimum operating pressure. Accordingly, the controller 100 adjusts the minimum operating pressure to the value between the lower limit and the upper limit of the minimum operating pressure.

As described above, the controller 100 adjusts the expansion pressure (e.g., the intake pressure) of the vacuum pump 13 so that the minimum operating pressure has the value between the lower limit and the upper limit of the minimum operating pressure. Thus, the controller 100 retains a constant amount of the toner T sucked by the transport tube 5a.

If the controller 100 determines that the detected maximum operating pressure is smaller than the lower limit of the maximum operating pressure (YES in steps S12, S18, and S23), the controller 100 adds the predetermined additional compression value to the compression pressure value that is currently set. The controller 100 controls the air compressor 12 to increase the compression pressure (e.g., the discharge pressure) in steps S13, S19, and S24. As the compression pressure (e.g., the discharge pressure) increases, the air compressor 12 increases positive pressure inside the air chamber 5b. The maximum operating pressure increases to a value not smaller than the lower limit of the maximum operating pressure. Accordingly, the controller 100 adjusts the maximum operating pressure to a value between the lower limit and the upper limit of the maximum operating pressure.

If the controller 100 determines that the detected maximum operating pressure is greater than the upper limit of the maximum operating pressure (YES in steps S14, S20, and S25), the controller 100 subtracts the predetermined subtraction compression value from the compression pressure value that is currently set. The controller 100 controls the air compressor 12 to decrease the compression pressure (e.g., the discharge pressure) in steps S15, S21, and S26. As the compression pressure decreases, the air compressor 12 decreases positive pressure inside the air chamber 5b, decreasing the maximum operating pressure to a value not greater than the upper limit of the maximum operating pressure. Accordingly, the controller 100 adjusts the maximum operating pressure to the value between the lower limit and the upper limit of the maximum operating pressure.

As described above, the controller 100 adjusts the compression pressure (e.g., the discharge pressure) of the air compressor 12 so that the maximum operating pressure has the value between the lower limit and the upper limit of the maximum operating pressure. Thus, the controller 100 retains a constant amount of the toner T discharged from the transport tube 5a.

As described above, the controller 100 controls the vacuum pump 13 and the air compressor 12 so that the minimum operating pressure and the maximum operating pressure have the value between the lower limit and the upper limit of the minimum operating pressure and the value between the lower limit and the upper limit of the maximum operating pressure, respectively. Thus, the controller 100 retains a constant replenishing speed in the precise replenishing mode. Accordingly, the replenishing amount of the toner T inside the toner replenishment container 7 is the desired replenishing amount in the precise replenishing mode. Thus, the controller 100 suppresses variation in the amount of the toner T inside the toner transport tube 6 and the nozzle tube 23 when the pneumatically driven pump 5 stops. Consequently, the controller 100 attains a substantially constant replenishing amount of the toner T that is supplied to the toner replenishment container 7 after the pneumatically driven pump 5 stops. Thus, the controller 100 adjusts the replenishing amount of the toner T inside the toner replenishment container 7 to the target replenishing amount precisely.

According to the embodiments described above, the controller 100 adds or subtracts the predetermined value to or from the compression pressure value and the expansion pressure value that are currently set. Alternatively, the controller 100 may perform other addition and subtraction. For example, the controller 100 may calculate a differential value between a detected operating pressure value and a median between a lower limit and an upper limit of operating pressure. The controller 100 may calculate a subtraction value or an additional value based on the differential value.

According to the embodiments described above, air (e.g., gas) is used as a pressure medium that applies operating pressure to the transport tube 5a. Alternatively, liquid such as oil may be used as the pressure medium. The pneumatically driven pump 5 may be a diaphragm pump. For example, a part of a transport-conveyance path is an elastic thin film. The diaphragm pump applies operating pressure to the thin film, expanding and contracting the transport-conveyance path.

According to the embodiments described above, the toner T is used as powder. However, the powder is not limited to the toner T. For example, the powder may be medicine or food ingredients that are powdery or granular.

The embodiments described above are examples and achieve advantages peculiar to aspects below, respectively.

A description is provided of a first aspect of the technology of the present disclosure.

As illustrated in FIGS. 1 and 4, a powder replenisher (e.g., the toner replenisher 1) includes a powder storage (e.g., the toner storage tank 2), a powder replenishing container (e.g., the toner replenishment container 7), a pressure adjuster (e.g., the pump driver 10), a positive-displacement pump (e.g., the pneumatically driven pump 5), a powder measuring instrument (e.g., the weighing scale 9), an operating pressure detector (e.g., the pressure gauge 14), a powder conveyance path (e.g., the toner transport tube 6), and a controller (e.g., the controller 100). The positive-displacement pump includes a variable capacity portion (e.g., the transport tube 5a).

The powder storage stores powder (e.g., the toner T). The powder replenishment container is replenished with the powder. The variable capacity portion has a capacity that is variable. The pressure adjuster increases and decreases operating pressure applied to the variable capacity portion and changes the capacity of the variable capacity portion. The positive-displacement pump transports the powder as the capacity of the variable capacity portion changes. The powder measuring instrument measures an amount (e.g., a weight) of the powder that replenishes the powder replenishment container. The operating pressure detector detects the operating pressure applied to the powder conveyance path. The controller performs a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount. In the precise replenishing mode, the controller replenishes the powder replenishment container with the powder while the controller controls the pressure adjuster based on a detection result, that is, the detected operating pressure detected by the operating pressure detector.

A description is provided of a construction of a comparative powder replenisher.

The comparative powder replenisher includes a conveying auger that supplies powder stored in a supply container serving as a powder storage to a weighing container serving as a powder replenishment container. When the weighing container is replenished with the powder in a predetermined amount, a controller of the powder replenisher decreases a replenishing speed. While a weighing scale serving as a powder measuring instrument measures an amount of the powder inside the weighing container, the weighing container is replenished with the powder in a target amount. Based on an error of the amount of the powder that replenishes the weighing container with respect to the target amount, the controller corrects a stop time when the conveying auger stops. Since the controller corrects the stop time of the conveying auger, the controller adjusts the amount of the powder supplied to the weighing container to the target amount precisely whenever the weighing container is replenished with the powder.

However, while the controller reduces stress applied to the powder, the controller may not adjust the amount of the powder inside the weighing container to the target amount precisely.

When the conveying auger conveys the powder, as the conveying auger rotates, the conveying auger may apply stress such as pressure to the powder, degrading the powder. Additionally, as the conveying auger, that rotates, applies stress such as pressure to the powder, the powder may adhere to each other, generating aggregation that may clog a powder conveyance path and hinder replenishment with the powder.

To address the circumstance, the powder replenisher according to the embodiment employs the positive-displacement pump that conveys the powder. The positive-displacement pump suppresses stress applied to the powder compared to the conveying auger that conveys the powder. Thus, the powder replenisher according to the embodiment suppresses degradation and aggregation of the powder inside the powder conveyance path.

The controller does not interrupt replenishment of the powder replenishment container with the powder immediately after the controller stops the positive-displacement pump. Even after the controller stops the positive-displacement pump, the powder inside the powder conveyance path interposed between the positive-displacement pump and the powder replenishment container is supplied to the powder replenishment container. Hence, according to the embodiment described above, in the precise replenishing mode, if the powder measuring instrument measures an amount of the powder inside the powder replenishment container, that is smaller than the target amount of the powder, the controller stops the positive-displacement pump. The controller calculates the amount of the powder that is smaller than the target amount by subtracting a determined amount of the powder from the target amount of the powder. The controller determines the determined amount of the powder by detecting an amount of the powder inside the powder conveyance path interposed between the positive-displacement pump and the powder replenishment container based on a set replenishing speed in the precise replenishing mode.

However, while the positive-displacement pump conveys the powder, the positive-displacement pump may have operating pressure that deviates from target operating pressure due to various factors, destabilizing a replenishing speed (e.g., an amount per unit time) of the powder supplied to the powder replenishment container. Accordingly, when the positive-displacement pump stops, the amount of the powder inside the powder conveyance path interposed between the positive-displacement pump and the powder replenishment container may vary. Consequently, the amount of the powder inside the powder replenishment container may not be the target amount of the powder.

To address the circumstance, according to the first aspect, the controller performs the precise replenishing mode after the controller determines that the powder replenishment container is replenished with the powder in the predetermined amount. In the precise replenishing mode, the operating pressure detector detects operating pressure applied to the variable capacity portion. Based on the detected operating pressure, the controller controls the pressure adjuster to replenish the powder replenishment container with the powder. Accordingly, for example, if the controller determines that the operating pressure that is applied to the variable capacity portion and detected by the operating pressure detector is lower than the target operating pressure, the controller controls the pressure adjuster to increase the operating pressure, adjusting the operating pressure applied to the variable capacity portion to the target operating pressure. Conversely, if the controller determines that the operating pressure that is applied to the variable capacity portion and detected by the operating pressure detector is higher than the target operating pressure, the controller controls the pressure adjuster to decrease the operating pressure, adjusting the operating pressure applied to the variable capacity portion to the target operating pressure. Accordingly, in the precise replenishing mode, the powder replenisher performs replenishing at the set replenishing speed stably. Consequently, the controller adjusts the amount of the powder supplied to the powder replenishment container to the target amount of the powder precisely.

A description is provided of a second aspect of the technology of the present disclosure.

Based on the first aspect, the powder replenisher further includes a deaerator (e.g., the degassing pump 20) that degases the powder replenishment container (e.g., the toner replenishment container 7). The controller performs an initial replenishing mode (e.g., the high-speed replenishing mode) that replenishes the powder replenishment container with the powder for a predetermined time period while the deaerator degases the powder replenishment container. After the controller finishes the initial replenishing mode, in order to replenish the powder replenishment container with the powder in a predetermined amount, the controller performs a deceleration replenishing mode that replenishes the powder replenishment container with the powder at a replenishing speed lower than a replenishing speed in the initial replenishing mode while the controller controls the powder measuring instrument (e.g., the weighing scale 9) to weigh a weight of the powder. The controller performs the precise replenishing mode after finishing the deceleration replenishing mode. In the precise replenishing mode, the controller replenishes the powder replenishment container with the powder at a replenishing speed lower than the replenishing speed in the deceleration replenishing mode.

Accordingly, as described above in the embodiments, the powder replenisher shortens a replenishing time period for which the powder is supplied to the powder replenishment container. The powder replenisher prevents the powder from overflowing the powder replenishment container (e.g., the toner replenishment container 7). The controller adjusts the amount of the powder inside the powder replenishment container to the target amount precisely.

A description is provided of a third aspect of the technology of the present disclosure.

Based on the second aspect, the controller decreases the replenishing speed for a plurality of times in the deceleration replenishing mode.

Accordingly, as described above in the embodiments, the controller decreases the replenishing speed according to a difference between the amount of the powder inside the powder replenishment container (e.g., the toner replenishment container 7) and the target amount of the powder. Thus, the controller prevents the powder from overflowing the powder replenishment container due to variation in the replenishing speed and shortens the replenishing time period.

A description is provided of a fourth aspect of the technology of the present disclosure.

Based on the third aspect, the controller determines the amount of the powder to be supplied to the powder replenishment container at each of the replenishing speeds in the deceleration replenishing mode based on the amount of the powder supplied to the powder replenishment container in the initial replenishing mode.

Accordingly, the controller decreases the replenishing speed according to the difference between the amount of the powder inside the powder replenishment container (e.g., the toner replenishment container 7) and the target amount of the powder. Thus, the controller prevents the powder from overflowing the powder replenishment container and shortens the replenishing time period.

A description is provided of a fifth aspect of the technology of the present disclosure.

Based on any one of the second to fourth aspects, the controller determines a time period for which the controller performs the initial replenishing mode (e.g., the high-speed replenishing mode) based on an average of the replenishing speeds of a plurality of last times.

Accordingly, as described above in the embodiments, when the initial replenishing mode (e.g., the high-speed replenishing mode) finishes, the controller suppresses variation in the amount of the powder inside the powder replenishment container (e.g., the toner replenishment container 7).

A description is provided of a sixth aspect of the technology of the present disclosure.

Based on any one of the first to fifth aspects, in the precise replenishing mode, based on the operating pressure detected by the operating pressure detector (e.g., the pressure gauge 14), the controller controls the pressure adjuster (e.g., the pump driver 10) to retain peak-to-peak operating pressure in a pressure range.

Accordingly, as described above in the embodiments, the controller retains a constant replenishing speed in the precise replenishing mode. The controller adjusts the amount of the powder inside the powder replenishment container to the target amount precisely.

A description is provided of a seventh aspect of the technology of the present disclosure.

A powder replenishing method replenishes the powder replenishment container (e.g., the toner replenishment container 7) with powder (e.g., the toner T) stored in the powder storage (e.g., the toner storage tank 2). The variable capacity portion (e.g., the transport tube 5a) has a capacity that is variable. The pressure adjuster (e.g., the pump driver 10) increases and decreases operating pressure applied to the variable capacity portion, changing the capacity of the variable capacity portion. The positive-displacement pump (e.g., the pneumatically driven pump 5) transports the powder as the capacity of the variable capacity portion changes. The controller performs a precise replenishing mode in which, after the controller determines that the powder replenishment container is replenished with the powder in a predetermined amount, while the controller controls the powder measuring instrument (e.g., the weighing scale 9) to measure an amount of the powder inside the powder replenishment container, the controller replenishes the powder replenishment container with the powder in a target amount. The operating pressure detector (e.g., the pressure gauge 14) detects the operating pressure applied to the variable capacity portion. While the controller controls the pressure adjuster based on the operating pressure detected by the operating pressure detector, the controller replenishes the powder replenishment container with the powder.

Accordingly, like in the first aspect, the controller suppresses stress applied to the powder and replenishes the powder replenishment container with the powder in the target amount precisely.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:
1. A powder replenisher comprising:
   a powder storage to store powder;
   a powder replenishment container to be replenished with the powder;
   a variable capacity portion having a capacity that is variable;

a pressure adjuster to increase and decrease operating pressure applied to the variable capacity portion, the pressure adjuster to change the capacity of the variable capacity portion to transport the powder;

a powder measuring instrument to measure an amount of the powder that replenishes the powder replenishment container;

an operating pressure detector to detect the operating pressure; and a controller operatively connected to the pressure adjuster, the powder measuring instrument, and the operating pressure detector, the controller to:

perform a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount; and control the pressure adjuster to replenish the powder replenishment container with the powder while the controller controls the pressure adjuster based on the operating pressure detected by the operating pressure detector in the precise replenishing mode, wherein:

the powder replenisher further comprises a deaerator to degas the powder replenishment container, the controller performs an initial replenishing mode in which the controller controls the pressure adjuster to replenish the powder replenishment container with the powder for a predetermined time period while the deaerator degases the powder replenishment container, the controller performs a deceleration replenishing mode in which the controller controls the pressure adjuster to replenish the powder replenishment container with the powder in the predetermined amount at a replenishing speed lower than a replenishing speed in the initial replenishing mode while the controller controls the powder measuring instrument to measure the amount of the powder after the controller finishes the initial replenishing mode, the controller performs the precise replenishing mode after the controller finishes the deceleration replenishing mode, the controller controls the pressure adjuster to replenish the powder replenishment container with the powder in the precise replenishing mode at a replenishing speed lower than the replenishing speed in the deceleration replenishing mode, and the controller controls the pressure adjuster to decrease the replenishing speed for a plurality of times in the deceleration replenishing mode.

2. The powder replenisher according to claim 1, wherein the controller determines the amount of the powder to be supplied to the powder replenishment container at the replenishing speed of each of the plurality of times in the deceleration replenishing mode based on the amount of the powder supplied to the powder replenishment container in the initial replenishing mode.

3. The powder replenisher according to claim 1, wherein the variable capacity portion includes a transport tube.

4. The powder replenisher according to claim 3, further comprising an air chamber to apply the operating pressure to the transfer tube.

5. A powder replenisher, comprising:

a powder storage to store powder;

a powder replenishment container to be replenished with the powder;

a variable capacity portion having a capacity that is variable;

a pressure adjuster to increase and decrease operating pressure applied to the variable capacity portion, the pressure adjuster to change the capacity of the variable capacity portion to transport the powder;

a powder measuring instrument to measure an amount of the powder that replenishes the powder replenishment container;

an operating pressure detector to detect the operating pressure; and a controller operatively connected to the pressure adjuster, the powder measuring instrument, and the operating pressure detector, the controller to:

perform a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount; and control the pressure adjuster to replenish the powder replenishment container with the powder while the controller controls the pressure adjuster based on the operating pressure detected by the operating pressure detector in the precise replenishing mode, wherein:

the powder replenisher further comprises a deaerator to degas the powder replenishment container, the controller performs an initial replenishing mode in which the controller controls the pressure adjuster to replenish the powder replenishment container with the powder for a predetermined time period while the deaerator degases the powder replenishment container, the controller performs a deceleration replenishing mode in which the controller controls the pressure adjuster to replenish the powder replenishment container with the powder in the predetermined amount at a replenishing speed lower than a replenishing speed in the initial replenishing mode while the controller controls the powder measuring instrument to measure the amount of the powder after the controller finishes the initial replenishing mode, the controller performs the precise replenishing mode after the controller finishes the deceleration replenishing mode, the controller controls the pressure adjuster to replenish the powder replenishment container with the powder in the precise replenishing mode at a replenishing speed lower than the replenishing speed in the deceleration replenishing mode, and the controller determines a time period for which the controller performs the initial replenishing mode based on an average of a plurality of last replenishing speeds at which the powder replenishment container is replenished with the powder.

6. A powder replenisher, comprising:

a powder storage to store powder;
a powder replenishment container to be replenished with the powder;
a variable capacity portion having a capacity that is variable;
a pressure adjuster to increase and decrease operating pressure applied to the variable capacity portion, the pressure adjuster to change the capacity of the variable capacity portion to transport the powder;
a powder measuring instrument to measure an amount of the powder that replenishes the powder replenishment container;
an operating pressure detector to detect the operating pressure; and
a controller operatively connected to the pressure adjuster, the powder measuring instrument, and the operating pressure detector,
the controller to:
perform a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount; and
control the pressure adjuster to replenish the powder replenishment container with the powder while the controller controls the pressure adjuster based on the operating pressure detected by the operating pressure detector in the precise replenishing mode,
wherein the controller controls the pressure adjuster to retain peak-to-peak operating pressure in a predetermined range based on the operating pressure detected by the operating pressure detector in the precise replenishing mode.

7. A powder replenisher, comprising:
a powder storage to store powder;
a powder replenishment container to be replenished with the powder;
a variable capacity portion having a capacity that is variable;
a pressure adjuster to increase and decrease operating pressure applied to the variable capacity portion, the pressure adjuster to change the capacity of the variable capacity portion to transport the powder;
a powder measuring instrument to measure an amount of the powder that replenishes the powder replenishment container;
an operating pressure detector to detect the operating pressure; and
a controller operatively connected to the pressure adjuster, the powder measuring instrument, and the operating pressure detector,
the controller to:
perform a precise replenishing mode in which, after the controller determines that the powder replenishment container is replenished with the powder in a predetermined amount, while the controller controls the powder measuring instrument to measure the amount of the powder inside the powder replenishment container, the controller controls the pressure adjuster to replenish the powder replenishment container with the powder in a target amount; and
control the pressure adjuster to replenish the powder replenishment container with the powder while the controller controls the pressure adjuster based on the operating pressure detected by the operating pressure detector in the precise replenishing mode,
wherein:
the powder replenisher further comprises a deaerator to degas the powder replenishment container,
the controller performs an initial replenishing mode in which the controller controls the pressure adjuster to replenish the powder replenishment container with the powder for a predetermined time period while the deaerator degases the powder replenishment container,
the controller performs a deceleration replenishing mode in which the controller controls the pressure adjuster to replenish the powder replenishment container with the powder in the predetermined amount at a replenishing speed lower than a replenishing speed in the initial replenishing mode while the controller controls the powder measuring instrument to measure the amount of the powder after the controller finishes the initial replenishing mode,
the controller performs the precise replenishing mode after the controller finishes the deceleration replenishing mode,
the controller controls the pressure adjuster to replenish the powder replenishment container with the powder in the precise replenishing mode at a replenishing speed lower than the replenishing speed in the deceleration replenishing mode, and
wherein the variable capacity portion includes a transport tube,
wherein the powder replenisher further comprises an air chamber to apply the operating pressure to the transfer tube,
wherein the pressure adjuster includes a pump driver to intake and exhaust air inside the air chamber, the pump driver including:
an air compressor to send the air into the air chamber; and
a vacuum pump to release the air from the air chamber.

8. The powder replenisher according to claim 7,
wherein the operating pressure detector includes a pressure gauge to measure the operating pressure inside the air chamber.

9. The powder replenisher according to claim 8,
wherein the controller controls the air compressor and the vacuum pump based on the operating pressure measured by the pressure gauge.

10. A powder replenishing method comprising:
storing powder in a powder storage;
controlling a pressure adjuster to increase and decrease operating pressure applied to a variable capacity portion;
changing a capacity of the variable capacity portion to transport the powder to a powder replenishment container;
determining that the powder replenishment container is replenished with the powder in a predetermined amount;
starting a precise replenishing mode;
measuring an amount of the powder inside the powder replenishment container;
detecting the operating pressure applied to the variable capacity portion;
controlling the pressure adjuster based on the detected operating pressure;
controlling the pressure adjuster to replenish the powder replenishment container with the powder in a target amount;

deaeratoring to degas the powder replenishment container;

performing an initial replenishing mode in which there is a controlling of the pressure adjuster to replenish the powder replenishment container with the powder for a predetermined time period while degassing the powder replenishment container;

performing a deceleration replenishing mode in which there is a controlling of the pressure adjuster to replenish the powder replenishment container with the powder in the predetermined amount at a replenishing speed lower than a replenishing speed in the initial replenishing mode while controlling the measuring to measure the amount of the powder after finishing the initial replenishing mode;

performing the precise replenishing mode after finishing the deceleration replenishing mode;

controlling the pressure adjuster to replenish the powder replenishment container with the powder in the precise replenishing mode at a replenishing speed lower than the replenishing speed in the deceleration replenishing mode; and controlling the pressure adjuster to decrease the replenishing speed for a plurality of times in the deceleration replenishing mode.

\* \* \* \* \*